Patented Aug. 19, 1941

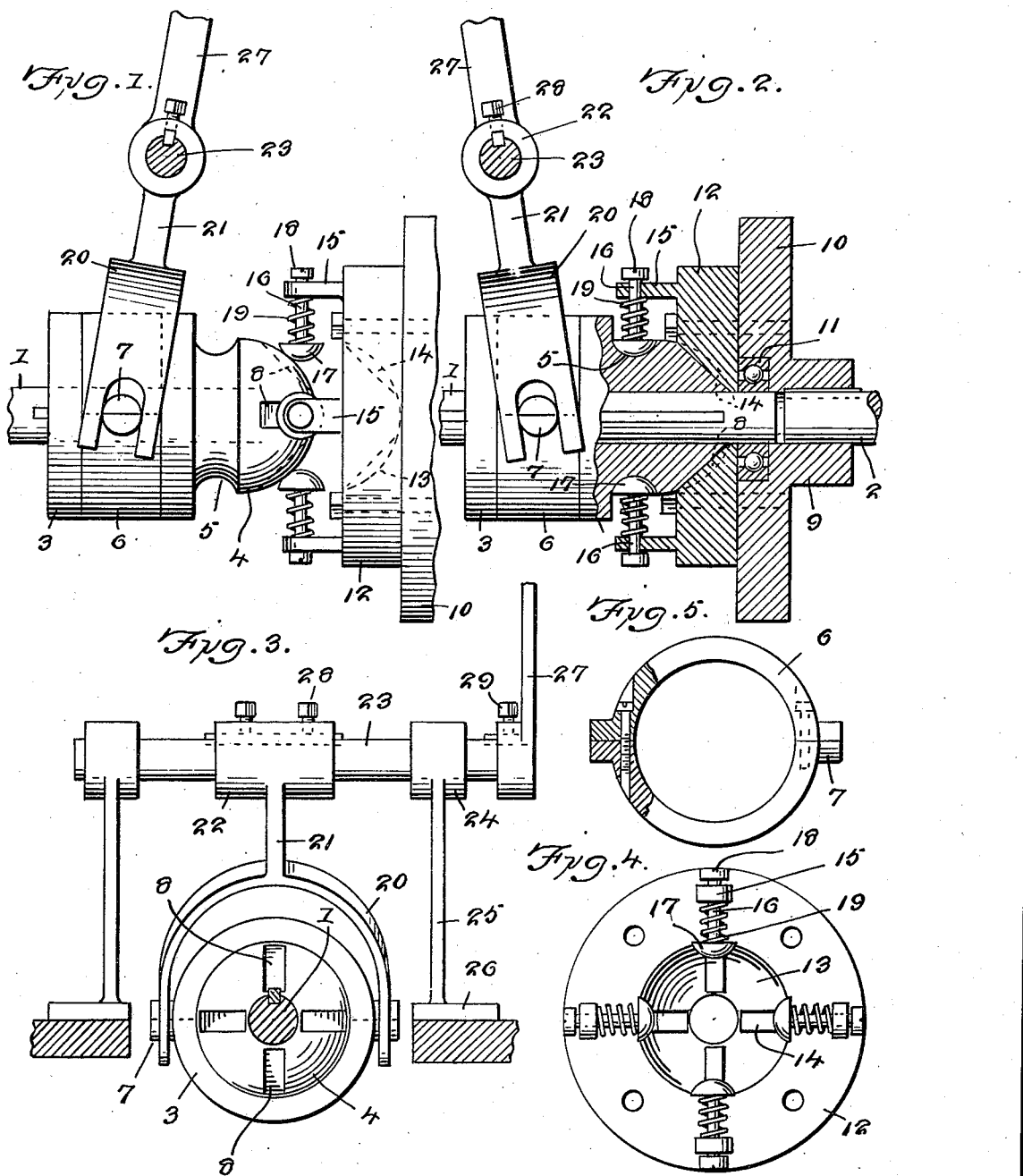

2,253,431

UNITED STATES PATENT OFFICE 2,253,431

CLUTCH

Christopher Johansen, Los Angeles, Calif.

Application October 7, 1940, Serial No. 360,192

2 Claims. (Cl. 192—67)

This invention relates to clutches, and its general object is to provide a clutch for coupling shafts of any type of machinery, but is primarily designed for use with marine engines for coupling the drive shaft thereof with the propeller shaft, the clutch being constructed in a manner so that it can be readily operable with minimum effort to engaged and disengaged positions, and when in engaged position, slippage or casual disconnection or displacement is practically impossible, due to the positive connection between the companion coupling elements.

A further object is to provide a clutch that is simple in construction, inexpensive to manufacture, can be readily installed and is extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side view of my clutch in disengaged position.

Figure 2 is a similar view partly in section but in engaged position.

Figure 3 is a view looking toward the head of the male coupling element and illustrates the shifting means therefor.

Figure 4 is a view looking toward the coupling face of the female coupling element.

Figure 5 is a view partly in section of the shifting collar.

Referring to the drawing in detail, the reference numeral 1 indicates a drive shaft which may be that of a marine engine, and 2 is a driven shaft which may be the propeller shaft, but in any event the shaft 1 has mounted and splined thereon for slidable movement the male coupling element that includes a substantially cylindrical body 3 having formed therewith a head provided with a substantially semi-spherical portion 4, and between the latter and the body the head is formed with a rounded annular channel groove 5, while the body is formed with an annular straight cornered groove within which is mounted a shifting collar 6 having diametrically opposed studs 7 formed on and extending outwardly therefrom, as best shown in Figure 3. The outer face of the semi-spherical portion is recessed to provide axially arranged pockets 8 for a purpose which will be later described.

Keyed to the driven shaft 2 is the hub portion 9 of a flywheel 10 having mounted therein a bearing 11 for the outer end of the drive shaft 1, the latter extending through the bearing, as best shown in Figure 2. Bolted or otherwise secured to the flywheel is the female coupling element which includes a disk member 12 having a centrally disposed concavity 13 therein shaped to fittingly receive the substantially semi-spherical portion 4, and the concavity has ribs 14 formed therein arranged and shaped to fit within the pockets 8, when the male element is shifted to operative or engaged position, as best shown in Figure 2, with the result it will be seen that a positive connection is provided for the companion coupling elements, to prevent any possibility of slippage thereof when the clutch is engaged.

In order to hold the female element against casual disengagement from its companion element, it will be noted that the disk member 12 has arms 15 extending from the outer face thereof adjacent its periphery, and the arms 15 have openings therein within which are slidably mounted for radial movement the shanks 16 of latch members having rounded heads 17 on their inner ends for fitting engagement within the channel groove 5. The outer ends of the shanks have stop members 18 fixed thereto to limit inward movement of the latch members and sleeved on the shanks between the arms 15 and the heads 17 are coil springs 19 that act to urge and hold the heads in their innermost position and within the groove 5, as will be apparent upon inspection of Figure 2.

The shifting collar 6 is made up of a pair of sections held together and within the groove of the body 3 by screw bolts, as shown in Figure 5 and the shifting fork includes a yoke 20 having bifurcated ends mounted on the studs 7. The fork also includes a shank 21 formed on the yoke and formed on the shank is a collar 22 keyed to a rock shaft 23 that is mounted for rocking movement in bearings 24 formed on the upper ends of a pair of parallel uprights 25 that are provided with base members 26 fixed to suitable supporting means, as clearly shown in Figure 2. The rock shaft has keyed thereto at one end thereof a handle 27 and by that construction, it will be obvious that the male element is shifted into and out of engagement with respect to the female element by movement of the handle 27. It will be noted from Figure 3 that the keys for the collar 22 and handle 27 are held fixed in their key ways by set screws 28 and 29 respectively.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A clutch for coupling a drive shaft with respect to a driven shaft for driving the latter, and comprising a male coupling element splined to the drive shaft for slidable movement and including a body, a head formed on the body and including a semi-spherical portion having pockets therein, a female element associated with the drive shaft and having a concavity therein for fittingly receiving the semi-spherical portion, ribs formed within the concavity and shaped to fit within the pockets, means for shifting the male element into and out of coupling position with respect to the female element, said head having an annular channel groove therein, arms formed on the female element, latch members including shanks slidably mounted through the arms, rounded heads on the shanks, and springs sleeved on the shanks between the arms and said rounded heads for urging the latter to a position to be received within the channel groove for holding the male element in coupled position.

2. A clutch for coupling a drive shaft with respect to a driven shaft for driving the latter, and comprising a male coupling element splined to the drive shaft for slidable movement and including a body, a head formed on the body and including a semi-spherical portion having pockets therein, a flywheel keyed to the driven shaft, a bearing mounted in the flywheel and receiving the drive shaft therein, a female element including a disk member bolted to the flywheel and having a concavity therein for fittingly receiving the semi-spherical element, ribs secured within the concavity and shaped to fit within the pockets, handled means associated with the body for shifting the male element into and out of coupled position with respect to the female element, said head having an annular channel groove therein, arms formed on the disk member and having openings therein, latching members including shanks mounted for slidable movement in said openings, rounded heads on the shanks, and coil springs sleeved on the shanks between the arms and the rounded heads for urging the latter toward each other for disposal within the annular channel groove for holding the male element in coupled position.

CHRISTOPHER JOHANSEN.